June 25, 1946.  F. THOMAS  2,402,931
ICE CREAM MACHINE
Filed Oct. 21, 1943
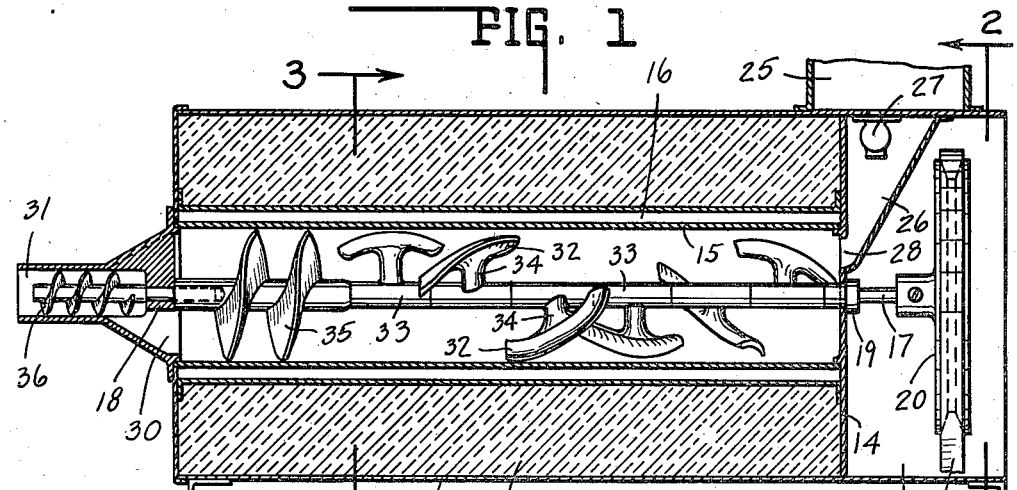
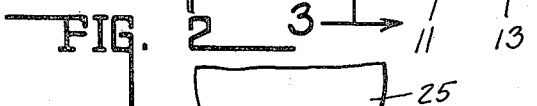
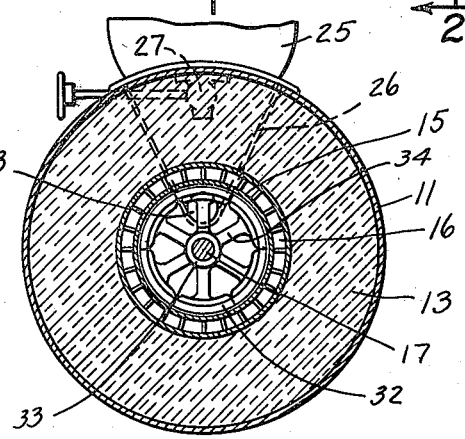
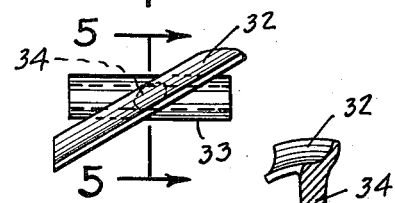
INVENTOR.
FRANK THOMAS.
BY Lockwood, Goldsmith & Galt
ATTORNEYS.

Patented June 25, 1946

2,402,931

UNITED STATES PATENT OFFICE 2,402,931

ICE CREAM MACHINE

Frank Thomas, Indianapolis, Ind.

Application October 21, 1943, Serial No. 507,089

3 Claims. (Cl. 62—114)

This invention pertains to an ice cream machine, used in the continuous production of ice cream or frozen confection, wherein a suitable mix is introduced at one end of the machine and the frozen product in edible condition is discharged at the other end thereof.

This invention is more particularly directed to a mechanism which will continuously process an ice cream mix by centrifugally maintaining the particles of the mix in a thin film about a freezing surface and continuously scraping or peeling the thin frozen film produced thereby from said freezing surface, and carrying it by such scraping and peeling action to the discharge end of the machine, whereupon it is discharged in finished edible form. As a result of such action the finished product is developed with a velvety texture of only approximately twenty-five percent overrun as compared with the usual fifty percent overrun, but without being compressed, packed or re-frozen. Thus the product maintains its original soft texture as compared with a frozen crystal texture of the higher overrun re-frozen ice creams.

This mechanism is so designed that the ice cream mix is kept in constant motion on the freezing wall of the machine, and the layer of mix on the wall is such as to effect proper heat transfer at such a rate that the freezing time is reduced to a minimum. The pitch of the scraping and feeding blades, and the angular velocity of said blades is such that the mix is moved parallel to the axis of the mechanism at such velocity as to arrive at the discharge end at the instant freezing is completed.

The period that the product remains in the machine is estimated to be from ten to fifteen seconds within which time full freezing of the product is completed, instead of the eighteen to forty-eight hours formerly required to freeze ice cream. Thus, the freezing time, with the consequent crystal growth, is greatly reduced.

The full nature of the invention will be understood from the accompanying drawing and the following description and claims:

Fig. 1 is a central longitudinal section through the machine.

Fig. 2 is a section taken on the line 2—2 of Fig. 1.

Fig. 3 is a section taken on the line 3—3 of Fig. 1.

Fig. 4 is a side elevation of the scraper blade with its bearing in section.

Fig. 5 is an enlarged section taken on the line 5—5 of Fig. 4.

In the drawing there is illustrated a machine embodying the invention comprising a base 10 for supporting a horizontally-disposed cylindrical housing 11. Said housing embraces at one end a minor compartment 12 separated from a major compartment 13 by a separating wall 14. The major compartment 13, between the wall 14 and the discharge end of the machine, encloses a refrigerating or freezing cylinder 15, said cylinder being provided with a pair of spaced concentric walls between which refrigerant carrying tubes or passages 16 are provided. Mounted axially of the cylinder 15 for rotation therein, there is a drive shaft 17 supported by a bearing 18 at the discharge end of the housing 11 and by bearing 19 in the partition wall 14.

On the extension of the shaft 17 there is provided a driving pulley 20 mounted in the compartment 12 and driven by a belt 21 from a motor 22 supported upon a frame 23 in the base of the compartment 10. The motor drive and belt are so designed as to drive the shaft 17 at about 350 R. P. M. Also, mounted within the base 10 there is a compressor 24 connected with the refrigerant passages or pipes 16 for refrigerating the internal freezing surface of the freezing cylinder 15. In this connection, it is desirable to maintain the inner freezing surface of said cylinder at approximately five degrees Fahrenheit.

The ice cream or frozen confection mix is contained in a vessel 25 mounted on the top of the housing 11 and communicating with a hopper 26 through an orifice controlled by a valve 27. The hopper 26 communicates with the interior of the cylinder 15 through a discharge opening 28 in the partition wall 14. At the other end or discharge end of the cylinder there is a diaphragm supporting the bearing 18 in which there is a discharge orifice 30 communicating with an exteriorly and forwardly extending discharge spout 31.

The shaft 17 carries within the major portion of the cylinder a series of diametrically opposed scraper blades 32 extending at an angle to the shaft with their outer edges curved to conform and lie adjacent the inner wall of the cylinder 15 to effect a scraping action about the freezing surface. Each blade is carried by a hub 33 through a reduced end portion 34, said hub being keyed or otherwise secured to the shaft 17 for rotation therewith. The length of the respective hubs is such that they abut each other end to end, each adjacent hub carrying its blade at about a sixty degrees angle to the preceding and following blade. As shown herein there are six such blades carried by the shaft in overlapping relation relative to each other, progressively spaced at sixty degree intervals about the shaft and freezing wall of the cylinder. The rearwardmost blade rotates adjacent the wall 14 to pick up the mix as it is introduced into the cylinder through the orifice 28.

By centrifugal force due to the rapid rotation thereof, the mix is spread about the freezing wall in a thin film, such that it is rapidly frozen. But such frozen film is continuously scraped by the respective blades, and due to their angular disposition carried forwardly from one blade to the next. Thus, the centrifugal force applied to the mix not only maintains it in freezing contact with the wall of the cylinder, but it is caused to constantly move thereabout and forwardly along the freezing wall to the forward or discharge end.

At the discharge end of the cylinder and adjacent the forwardmost of said blades there is a helical feed screw 35 keyed to and rotatable with said shaft for gathering the frozen mix and feeding it through the discharge orifice 30 into the spout 31. Within said spout there is also provided a helical feed screw 36 keyed to and rotatable with said shaft, which receives and carries the finished product forward for discharge from the machine.

In view of the above, it will be noted that the mix is maintained at all times distributed about the freezing wall of the cylinder in a thin film such that the particles will freeze upon being thrown against said freezing surface, but which are constantly being scraped or peeled therefrom and moved forwardly from one scraping blade to the next while maintained in contact with the freezing surface by centrifugal force. Such centrifugal force keeps the frozen particles moving longitudinally of the freezing wall until they are gathered by the discharge screw 35 and fed thereby from the machine. Thus, the mix is so frozen as it emerges from the machine that it is immediately in edible condition and requires no further freezing action.

The invention claimed is:

1. A machine for producing edible frozen confection in continuous operation, including a cylindrical freezing chamber for continuously receiving at one end a mix to be frozen and continuously discharging edible frozen confection at the other end thereof, a motor driven shaft mounted for rotation axially of said chamber, a series of scraper blades mounted radially about said shaft in staggered relation, each of said blades being biased to extend at an angle to the axial center of said shaft and formed with a concave scraping face curved to conform with the cylindrical surface of said chamber, means for directing the mix to be frozen into one end of said chamber to be scraped by said blades along the wall of said chamber toward the other end thereof, and means for continuously discharging the frozen confection from said last mentioned end of said chamber.

2. A machine for producing an edible frozen confection in a continuous operation, including a cylindrical freezing chamber for continuously receiving at one end a mix to be frozen and continuously discharging edible frozen confection at the other end thereof, a shaft rotatably mounted axially of said cylinder, means for rotating said shaft, and a series of scraper blades progressively mounted along said shaft to extend at an angle to the axial center thereof and in scraping relation with the surface of said chamber, each of said blades extending through an arc adjacent the surface of said chamber and in staggered relation to each other with the combined arcs through which the staggered blades extend co-extensive with the circumference of said chamber.

3. A machine for producing an edible frozen confection in a continuous operation, including a cylindrical freezing chamber for continuously receiving at one end a mix to be frozen and continuously discharging edible frozen confection at the other end thereof, a shaft rotatably mounted axially of said chamber, means for rotating said shaft, a series of scraper blades mounted in staggered relation along said shaft to be rotated thereby, said blades extending at an angle to said shaft and curved to conform to the curvature of said chamber throughout their length, a hopper communicating with one end of said chamber through which material to be mixed is continuously introduced therein to be simultaneously scraped from and conveyed along the wall of said chamber toward a discharge end thereof, a discharge screw mounted on said shaft adjacent the discharge end of said chamber and a discharge feed screw extending from the end of said shaft for receiving and continuously discharging the frozen mix conveyed thereto by said scraper blades and feed screw.

FRANK THOMAS.